May 15, 1951 — A. J. BAYTO — 2,553,231
HOLDER FOR FISHING RODS OR POLES
Filed April 1, 1949 — 2 Sheets-Sheet 1
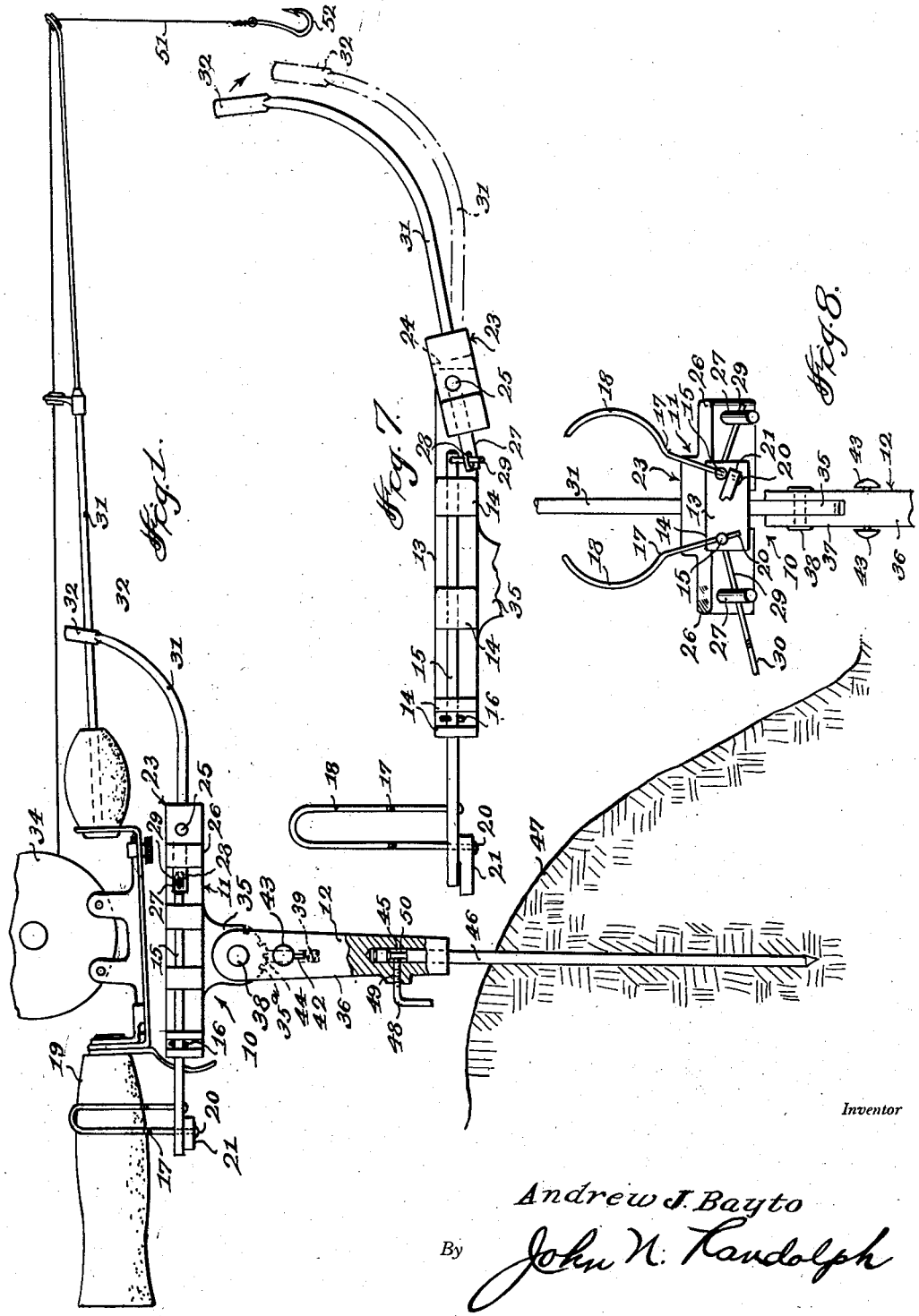
Inventor
Andrew J. Bayto
By John N. Randolph
Attorney

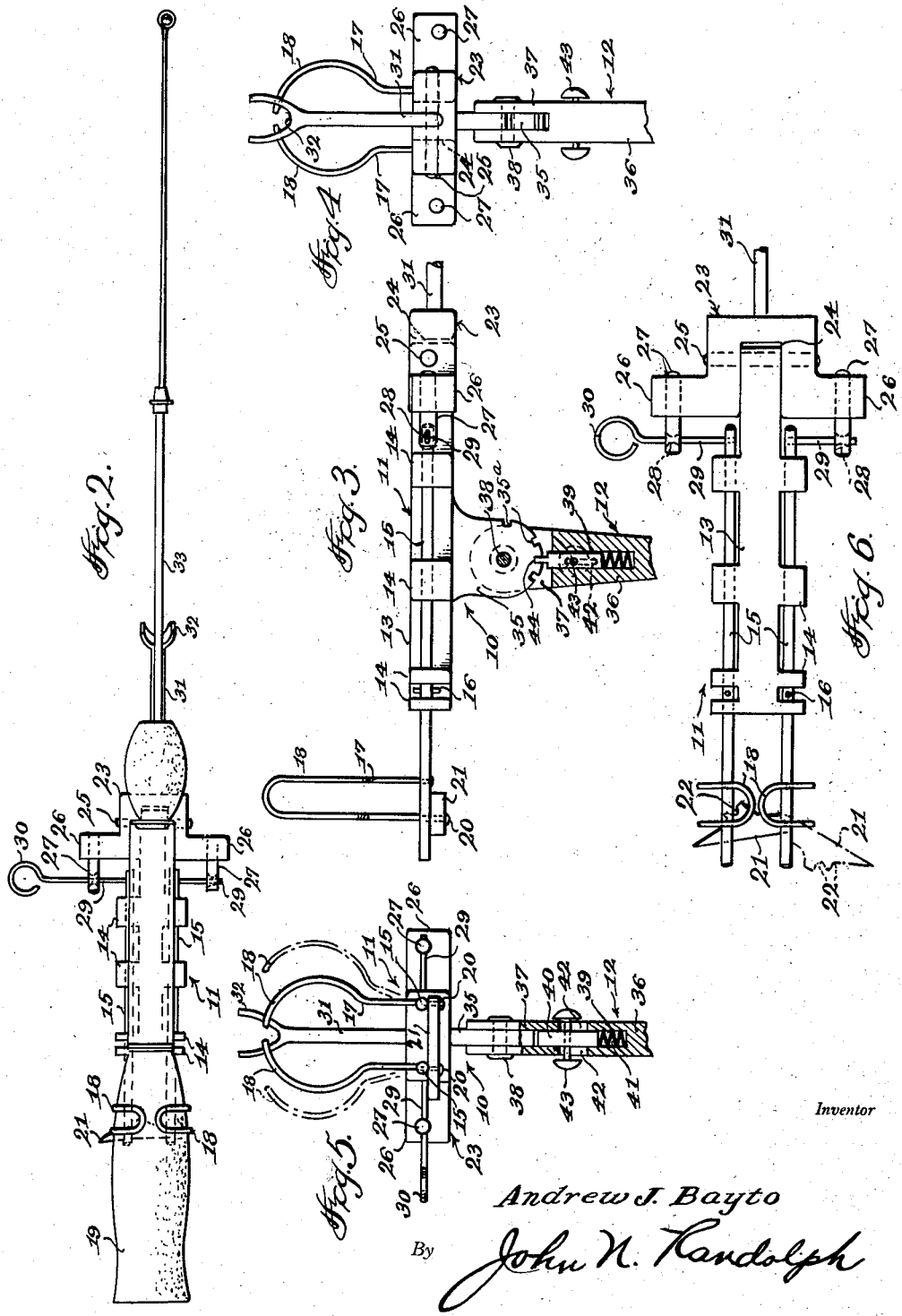

Patented May 15, 1951

2,553,231

UNITED STATES PATENT OFFICE 2,553,231

HOLDER FOR FISHING RODS OR POLES

Andrew J. Bayto, Muse, Pa., assignor of one-half to George Trputac, Edinboro, Pa.

Application April 1, 1949, Serial No. 84,980

3 Claims. (Cl. 248—42)

This invention relates to a novel holder in which a fishing rod or pole is detachably clamped by the weight of the rod or pole to prevent the pole or rod from being disengaged from the holder when a pull is exerted downwardly on the outer end of the rod or pole, as would occur when a fish strikes on a line extending from the rod or pole, yet which can be quickly and easily removed from the holder by the simple expedient of lifting upwardly on the rod or pole adjacent its butt or handle end.

Another object of the invention is to provide a holder which will automatically clamp a rod or pole when applied thereto and the clamping action on which will be increased as a downward pressure is exerted on the tip of the rod or pole.

A further object of the invention is to provide a holder of the aforedescribed character of relatively simple construction which may be economically manufactured and sold and which will be extremely durable and efficient for use either for fishing from a shore or bank or from a boat and which may be utilized for either still fishing or trolling to relieve the fisherman of the necessity of constantly holding the rod or pole manually and without danger of the rod or pole and a reel attached thereto falling in sand or dirt.

Still a further object of the invention is to provide a holder of the aforedescribed character provided with a novel locking means for positively locking the rod or pole in the holder to obviate the possibility of the rod or pole becoming disengaged from the holder as might otherwise occur as the result of vibration in fishing from a moving boat.

Numerous other objects and advantages of the invention will hereinafter become more fully apparent from the following description of the drawings, illustrating a presently preferred embodiment thereof, and wherein:

Figure 1 is a side elevational view, partly in vertical section showing the improved holder for a fishing rod or pole and with the fishing rod, equipped with a reel, shown applied thereto;

Figure 2 is a top plan view of the holder with the rod applied but with the reel removed;

Figure 3 is a fragmentary side elevational view of a portion of the holder and shown partly in vertical section;

Figure 4 is an end elevational view of the holder looking from right to left of Figures 1 and 2.

Figure 5 is an end elevational view, partly in vertical section looking toward the opposite end of the holder;

Figure 6 is a fragmentary top plan view of the holder;

Figure 7 is a fragmentary side elevational view thereof, showing the holder in an open position, and Figure 8 is a fragmentary end elevational view looking from left to right of Figure 7 and showing the holder in its open position.

Referring more specifically to the drawings, the novel holder for fishing rods and poles in its entirety and as illustrated in Figure 1 is designated generally 10 and includes an upper holder section, designated generally 11 and a lower mounting section, designated generally 12.

The upper holder section 11 includes an elongated body member or bar 13 having lateral projections 14 extending from each side thereof. The projections 14 at each side of the bar 13 are provided with longitudinally aligned openings or bores for journalling complementary shafts 15 therein, one of which shafts is disposed on each side of the body member or bar 13. It will be apparent that the shafts 15 are journalled to revolve on their longitudinal axes which are parallel to the longitudinal axis of the bar 13 and a pin 16 extends through each of said shafts between adjacently disposed projections 14 for preventing any appreciable sliding movement of the shafts relatively to the body member 13. The rear ends of the shafts 15 extend rearwardly substantially beyond the rear end of the bar 13 and the rearwardly extending portion of each shaft 15 is provided with a substantially inverted U-shaped clamp section 17 the terminals of the legs of which are rigidly fixed to said shaft. The clamp sections 17 normally extend upwardly from the shafts 15 and are provided with complementary outwardly bowed upper free end portions 18 shaped to receive and clamp a portion of the butt or handle 19 of a fishing rod or pole therein when such clamp sections 17 are in a closed position, as illustrated in Figure 4 and in full lines in Figure 5. The shafts 15, adjacent their rear ends, are also each provided with a depending headed pin 20 on one of which pins is swingably mounted a latch member 21 which is disposed to swing in a plane parallel to the plane of the axis of its shaft 15. The latch 21 is provided with a plurality of notches 22 for selectively engaging the pin 20 of the other shaft 15 for latching the shafts against rotation in directions to permit the clamp sections 17 to swing outwardly of one another and for releasably latching said clamp sections in closed positions, as illustrated in full lines in Figure 5.

A crosshead 23 is provided with an inwardly opening centrally disposed recess 24 to loosely receive the forward end of the bar 13 and is disposed forwardly of the projections 14 and shafts 15. A pin 25 extends transversely through the forward portion of the bar 13 and through portions of the crosshead 23 for pivotally mounting said crosshead on the bar 13 for pivotal movement on the axis 25 which is disposed transversely to the axes of rotation of the shafts 15. The crosshead 23 at its inner end is provided with laterally projecting arms 26 each of which has a pin 27 swivelly mounted therein on an axis substantially at right angles to the axis of the pin 25. The pins 27 have rearwardly extending ends each provided with a diametrical opening 28 for loosely receiving a pin 29. The pins 29 are fixed to and project laterally from the shafts 15, adjacent the forward ends thereof and one of said pins 29 may be elongated and provided with a handle 30 at its outer end. A supporting arm 31 which is fixed to or formed integral with the forward end of the crosshead 23 extends forwardly therefrom and has an upwardly curved free end the terminal portion of which is slit to provide an upwardly opening fork 32 adapted to receive a portion of a fishing rod or pole 33 which projects from the butt or handle 19 and so that when the holder 10 is utilized for supporting a rod and reel the reel 34 thereof will be disposed between the clamp sections 17 and fork 32 and approximately above the body member 13.

The body member or bar 13 is provided intermediate of its ends with a depending ear 35 which is disposed in a plane parallel to the longitudinal axis of said bar 13. The ear 35 is provided with an arcuate bottom edge having spaced notches 35a formed therein. The supporting section 12 includes an elongated body member 36 having a bifurcated upper end 37 to receive therein the ear 35 and which is rotatably connected thereto by a pin 38 which extends through the ear 35 and through the furcations of the portion 37 for swingably supporting the holder section 11 on the mounting section 12. The body member 36 of the mounting section 12 is provided with a longitudinally extending recess 39 having one end opening into the bifurcated portion 37 for receiving a latch plunger 40 which is reciprocally disposed therein and urged upwardly into the bifurcation 37 by a spring 41 which is disposed in the bottom of the recess 39 and against the lower end of the plunger 40. The support member 36 is provided with opposed longitudinally extending slots 42 for slidably receiving the shank portions of headed actuating elements 43 which project laterally from the plunger 40 and the heads of which are disposed externally of the support member 36 to be manually engaged for retracting the plunger 40 out of the bifurcation 37. The upper restricted end 44 of the plunger 40 is adapted to be normally projected by the spring 41 into engagement with one of the notches 35a for latching the holder section 11 in a fixed position relatively to the mounting section 12 but it will be readily apparent that the holder section can be angularly adjusted on the mounting section 12 and latched so that its forward end, as defined by the arm 31, may be inclined either upwardly or downwardly. One of the notches 35a is also provided to latch the holder section 11 in a position substantially parallel to the mounting section 12 for storage of the holder 10, when not in use.

As seen in Figure 1, the mounting member 36 is illustrated as being provided with a downwardly opening socket 45 to receive the upper end of a stake or post 46, the lower end of which is illustrated in Figure 1 as being driven into the earth of the bank of a body of water, indicated at 47. A screw 48, which is adapted to be manually turned, is threaded into a radial threaded bore 49 of the support member 36 which opens into the socket 45 and is adapted to be tightened for engaging an upper portion of the post or stake 46 to clamp it in the socket 45 and which stake portion 50 is preferably restricted to prevent accidental removal of the stake from the socket when the screw 48 is in a tightened position. However, it will be readily apparent that the post 46 could be positioned in a socket or opening of a boat or the support member 36 could be provided at its lower end with a conventional clamp, in lieu of the socket 45 for securing the supporting section 15 to a portion of a boat, pier or other surface on which the holder 10 can be equally well mounted.

From the preceding detailed description of the construction of the holder 10 and the manner in which the fishing rod or pole is mounted therein, the operation and use of the holder will be readily apparent. Assuming that the mounting section 12 is supported in substantially an upright position by the post or stake 46 or in any other manner, it will be apparent that the holder section 11 will be positioned thereabove either substantially at a right angle thereto, as illustrated in Figure 1, or inclined in either direction. To apply the fishing rod 33 to the holder 10 the butt or handle 19 can be pressed between the upper spaced ends of the clamp sections 17 for spreading said sections to cause them to assume the positions of Figure 8 or the dotted line positions of Figure 5, or the clamp sections may be moved to this position by exerting a slight downward pressure on the handle 30. After the butt of the rod 19 has been thus positioned between the clamp portions 18, the rod is allowed to swing downwardly to position a portion thereof in the fork 32 which is then disposed in the full line position of Figure 7. By then releasing the fishing rod or pole, the weight thereof will cause the supporting arm 31 to swing downwardly on the pivot 25 to its dotted line position of Figure 7 or to its full line position of Figure 1 thus causing the crosshead 23 to rock with the supporting arm 31 in a clockwise direction as seen in Figures 1 and 7 thereby causing the rear ends of the pins 27 to be swung upwardly for swinging the pins 29 upwardly which will cause the shafts 15 to be revolved in opposite directions and in directions for swinging the clamp sections 17 inwardly from their open positions of Figure 8 or their dotted line positions of Figure 5 to their full line positions of Figures 4 and 5 for clamping the butt or handle 19 between the clamp portions 18. The weight of the rod or pole 23 will maintain the clamp sections 17 in a closed position for retaining the fishing rod or pole in the holder 10 but by merely lifting upwardly on the rod or pole the downward pressure on the supporting arm 31 will be removed permitting the clamp section 17 to be swung outwardly by camming engagement with the handle or butt 19 as it moves upwardly to thus quickly and easily remove the fishing rod or pole from the holder 10. However, with the fishing rod or pole applied and clamped in the holder 10, as just previously described, if a pull is exerted on the depending end of the fishing line 51, which depends from the tip of the rod 33, as by a fish striking the hook 52, this downward pull on the rod 33 will exert additional downward pressure on the supporting arm 31 for more securely holding the clamp sections 17 in clamping engagement with the butt or handle 19.

For using the holder 10 on a moving boat, as for trolling, to insure that the rod 33 will not be accidentally disengaged from the holder 10 due to the vibration from the boat, after the rod has been applied, as illustrated in Figure 1 and previously described, the latch 21 is swung to its latched position, as illustrated in Figures 1, 2, 5 and 6 for positively locking the clamp sections 17 in clamping engagement with the butt or handle 19 to prevent removal of the fishing rod from the holder until the latch 21 is manually released.

Various modifications and changes are contemplated and may obviously be resorted to, without departing from the spirit or scope of the invention as hereinafter defined by the appended claims.

I claim as my invention:

1. A holder for fishing rods or poles comprising an elongated body member having a forward end and a rear end, a clamp formed of complementary sections adapted to releasably engage the butt or handle of a fishing rod or pole, means supported by and journaled in said body member for mounting the clamp adjacent the rear end of the body member, said clamp sections being swingably supported by said means relatively to the body member for swinging movement in planes transversely to the longitudinal axis of the body member, a member pivotally supported on the forward end of the body member on an axis disposed transversely of the longitudinal axis of the body member, a rod or pole supporting arm extending forwardly and upwardly from said member for engaging and supporting the rod or pole forwardly of the butt or handle, said member and supporting arm being urged to swing downwardly by the weight of the rod or pole, and means connecting said member to the supporting means of said clamp sections for rocking the clamp sections toward closed positions when said supporting arm and member are swung downwardly relatively to the body member by the weight of the fishing rod or pole, said first mentioned means comprising shafts journalled in the body member and disposed in laterally spaced substantially parallel relationship, and one of said clamp sections being fixedly mounted on each of said shafts and projecting substantially radially therefrom.

2. A holder for fishing rods or poles comprising an elongated body member having a forward end and a rear end, a clamp formed of complementary sections adapted to releasably engage the butt or handle of a fishing rod or pole, means supported by and journaled in said body member for mounting the clamp adjacent the rear end of the body member, said clamp sections being swingably supported by said means relatively to the body member for swinging movement in planes transversely to the longitudinal axis of the body member, a member pivotally supported on the forward end of the body member on an axis disposed transversely of the longitudinal axis of the body member, a rod or pole supporting arm extending forwardly and upwardly from said member for engaging and supporting the rod or pole forwardly of the butt or handle, said member and supporting arm being urged to swing downwardly by the weight of the rod or pole, and means connecting said member to the supporting means of said clamp sections for rocking the clamp sections toward closed positions when said supporting arm and member are swung downwardly relatively to the body member by the weight of the fishing rod or pole, said first mentioned means comprising shafts journalled in the body member and disposed in laterally spaced substantially parallel relationship, one of said camp sections being fixedly mounted on each of said shafts and projecting substantially radially therefrom, and manually actuated latch means associated with said shafts for releasably latching the clamp sections in a clamping position.

3. A holder for fishing rods or poles, comprising an elongated body member having a forward end and a rear end, a clamp formed of complementary sections adapted to releasably engage the butt or handle of a fishing rod or pole, means supported by and journaled in said body member for mounting the clamp adjacent the rear end of the body member, said clamp sections being swingably supported by said means relatively to the body member for swinging movement in planes transversely to the longitudinal axis of the body member, a member pivotally supported on the forward end of the body member on an axis disposed transversely of the longitudinal axis of the body member, a rod or pole supporting arm extending forwardly and upwardly from said member for engaging and supporting the rod or pole forwardly of the butt or handle, said member and supporting arm being urged to swing downwardly by the weight of the rod or pole, and means connecting said member to the supporting means of said clamp sections for rocking the clamp sections toward closed positions when said supporting arm and member are swung downwardly relatively to the body member by the weight of the fishing rod or pole, said first mentioned means comprising shafts journalled in the body member and disposed in laterally spaced substantially parallel relationship, one of said clamp sections being fixedly mounted on each of said shafts and projecting substantially radially therefrom, said last mentioned means including pins projecting laterally outwardly of said shafts adjacent their forward ends and pins journaled in said member and disposed parallel to the longitudinal axis of said body member through which said first mentioned pins loosely extend for causing said shafts to be turned on their longitudinal axes when said member is swung on its pivot.

ANDREW J. BAYTO.

REFERENCES CITED

The following references are of record in the file of this patent:

UNITED STATES PATENTS

| Number | Name | Date |
| --- | --- | --- |
| 1,410,798 | Cowdery | Mar. 28, 1922 |
| 1,963,463 | Hammer | June 19, 1934 |
| 2,458,881 | Steuer | Jan. 11, 1949 |
| 2,481,118 | Johns | Sept. 6, 1949 |

FOREIGN PATENTS

| Number | Country | Date |
| --- | --- | --- |
| 596,336 | France | Aug. 8, 1925 |